United States Patent
Nakano

(10) Patent No.: US 9,765,721 B2
(45) Date of Patent: Sep. 19, 2017

(54) CLOSED BREATHER DISCONNECTION DETECTION METHOD

(71) Applicant: HINO MOTORS, LTD., Hino-shi (JP)

(72) Inventor: Hitoshi Nakano, Tokyo (JP)

(73) Assignee: HINO MOTORS, LTD., Hino-shi (JP)

( * ) Notice: Subject to any disclaimer, the term of this patent is extended or adjusted under 35 U.S.C. 154(b) by 239 days.

(21) Appl. No.: 14/435,941

(22) PCT Filed: Oct. 29, 2013

(86) PCT No.: PCT/JP2013/006379
§ 371 (c)(1),
(2) Date: Apr. 15, 2015

(87) PCT Pub. No.: WO2014/068949
PCT Pub. Date: May 8, 2014

(65) Prior Publication Data
US 2015/0267633 A1    Sep. 24, 2015

(30) Foreign Application Priority Data

Nov. 5, 2012 (JP) .................................. 2012-243426

(51) Int. Cl.
*F02D 41/22* (2006.01)
*F02D 45/00* (2006.01)
(Continued)

(52) U.S. Cl.
CPC ............. *F02D 41/22* (2013.01); *F01M 11/10* (2013.01); *F01M 13/00* (2013.01);
(Continued)

(58) Field of Classification Search
CPC .......... F02D 41/22; F02D 41/18; F02D 45/00; F02D 41/222; F01M 13/00; F01M 13/028; F01M 13/04; G01F 1/00; G01L 11/00
See application file for complete search history.

(56) References Cited

U.S. PATENT DOCUMENTS

| 2008/0058994 A1 | 3/2008 | Tsuda et al. |
| 2012/0048247 A1* | 3/2012 | Narita .................. F01M 13/022 123/573 |

(Continued)

FOREIGN PATENT DOCUMENTS

| DE | 10 2010 040 900 A1 | 3/2012 |
| JP | 2007-2838 A | 1/2007 |

(Continued)

OTHER PUBLICATIONS

English Machine Translation of Sato et al, JP 2007-002838 A, Jan. 11, 2007, Translated Feb. 1, 2017.*

(Continued)

*Primary Examiner* — Hezron E Williams
*Assistant Examiner* — David Z Huang
(74) *Attorney, Agent, or Firm* — Oblon, McClelland, Maier & Neustadt, L.L.P.

(57) ABSTRACT

Disclosed is a method for detecting disconnection of a closed breather 18 separating and recovering oil mist from blow-by gas 17 extracted from an engine 1 to return the blow-by gas through a gas return pipe 19 to an intake pipe 5. Under condition of no exhaust gas 9 recirculation being conducted, a mass flow rate of in-cylinder working gas is calculated based on a boost pressure, an intake temperature of an intake manifold 7 and a rotational frequency of the engine, and whether the calculated mass flow rate is divergent from a value detected by an air flow sensor 24 is determined. When determined to be divergent, the diver- (Continued)

gence in a last determination is compared with a current divergence; if difference between the divergences is beyond a predetermined range, the gas return pipe 19 is determined to be in disconnection from the intake pipe 5.

6 Claims, 1 Drawing Sheet

(51) Int. Cl.
  *F01M 13/00*  (2006.01)
  *F02D 41/18*  (2006.01)
  *F01M 13/02*  (2006.01)
  *F01M 13/04*  (2006.01)
  *G01F 1/00*  (2006.01)
  *G01L 11/00*  (2006.01)
  *G01M 15/04*  (2006.01)
  *F02M 35/10*  (2006.01)
  *F01M 11/10*  (2006.01)

(52) U.S. Cl.
  CPC .......... *F01M 13/028* (2013.01); *F01M 13/04* (2013.01); *F02D 41/18* (2013.01); *F02D 41/222* (2013.01); *F02D 45/00* (2013.01); *F02M 35/10222* (2013.01); *G01F 1/00* (2013.01); *G01L 11/00* (2013.01); *G01M 15/042* (2013.01); *F02D 2200/0402* (2013.01); *F02D 2200/0406* (2013.01); *F02D 2250/08* (2013.01); *Y02T 10/40* (2013.01)

(56) References Cited

U.S. PATENT DOCUMENTS

2012/0179356 A1\* 7/2012 Ide ..................... F02D 41/0007
                701/104
2013/0228006 A1  9/2013 Kuhn et al.

FOREIGN PATENT DOCUMENTS

| JP | 2007-198353 A | 8/2007 |
| JP | 2008-57498 A | 3/2008 |
| JP | 2010-242727 A | 10/2010 |
| JP | 2010-261325 A | 11/2010 |

OTHER PUBLICATIONS

International Search Report Issued Nov. 26, 2013 in PCT/JP13/006379 Filed Oct. 29, 2013.

Extended European Search Report issued on Sep. 15, 2016 in Patent Application No. 13851435.1.

\* cited by examiner

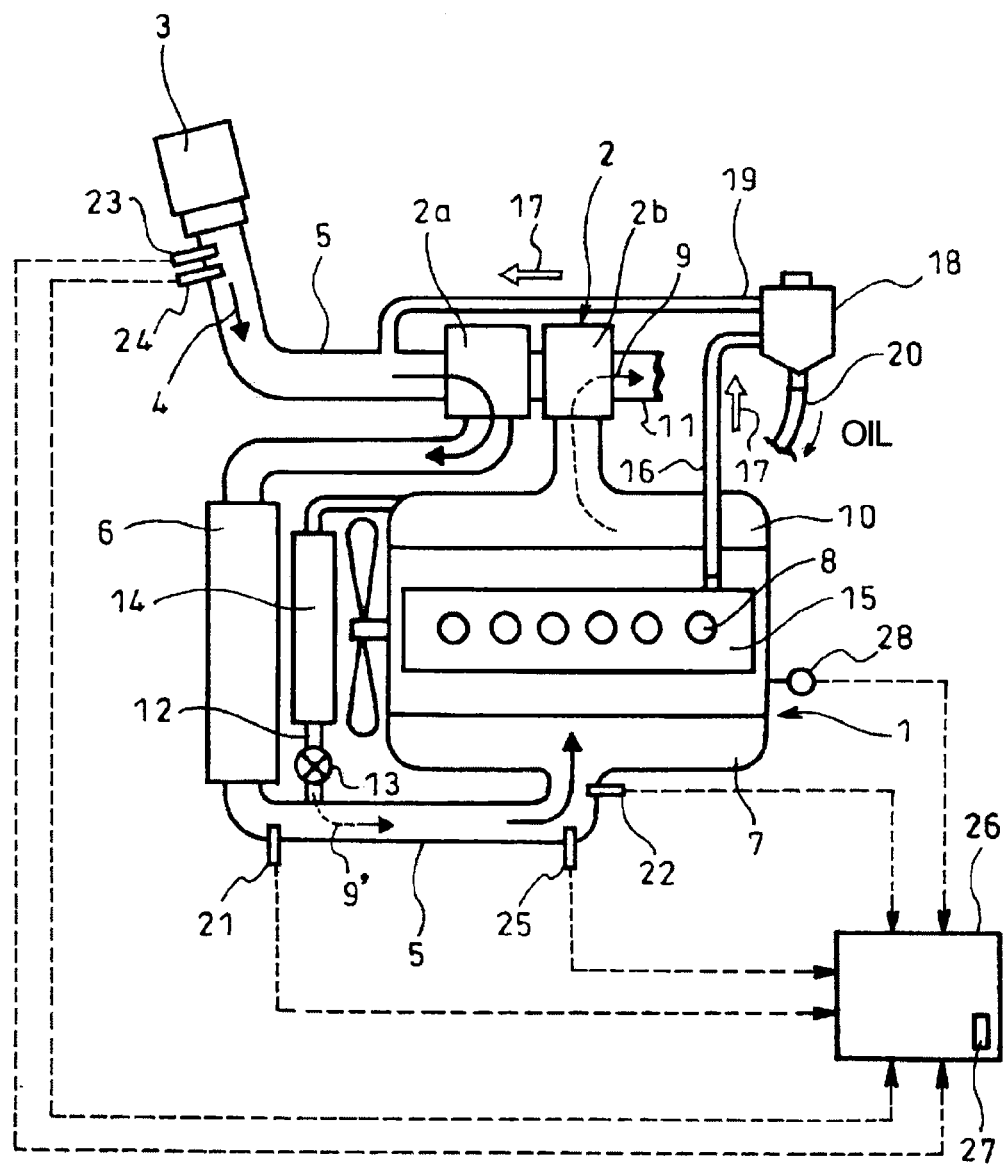

CLOSED BREATHER DISCONNECTION DETECTION METHOD

TECHNICAL FIELD

The present invention relates to a method for detecting disconnection of a closed breather.

BACKGROUND ART

Blow-by gas leaking through a gap of a piston ring into a crankcase during engine compression and explosion strokes, which fills the crankcase and a cylinder head cover in communication therewith, is required to be released outside. However, the crankcase and the cylinder head cover are full of oil mist since the crankcase has therein a crankshaft, a connecting rod and the like which move fast, and the cylinder head cover in communication with the crankcase has therein a rocker arm, a valve and the like which are in work.

Thus, release of the blow-by gas as it is to the atmosphere may disadvantageously cause the oil mist mixed in the blow-by gas to be also discharged outside, so that provided is a closed breather (CCV: Closed Crankcase Ventilator) having therein a filtering net or a labyrinth structure for separation and recovery of the oil mist in the blow-by gas. The blow-by gas extracted from the cylinder head cover of the engine is passed to the closed breather for separation and recovery of the oil mist and is returned through a gas return pipe to an intake pipe while the oil recovered by the closed breather is returned through an oil recovery pipe to an oil pan (not shown).

In such closed breather system, when the cylinder head cover is dismounted, for example, for maintenance of the engine, the gas return pipe is also removed from the intake pipe. After completion of the maintenance or the like, there is a fear that only the cylinder head cover is remounted while re-connection of the gas return pipe to the intake pipe may be forgotten. Thus, obligated in U.S.A. from 2010 onward is to detect disconnection (forgotten connection) of the gas return pipe in a larger vehicle.

In case of the forgotten connection of the return pipe, air may be taken in also through a portion of the intake pipe to which the gas return pipe is to be connected; then, even if a flow rate of air fed into the engine remained unchanged, an air flow rate (mass flow rate of air) detected by an air flow sensor would be reduced. Thus, for example, Patent Literature 1 mentioned hereinafter has suggested a technique that a normal air flow rate stored, for example, at a start of the engine in a last drive cycle (from key-on to key-off) is compared with a value detected by the air flow sensor in a current drive cycle under operational conditions unchanged to determine disconnection of the gas return pipe when the detected value is lower than the normal air flow rate by a predetermined threshold value or more.

CITATION LIST

Patent Literature

[Patent Literature 1] JP 2010-261325A

SUMMARY OF INVENTION

Technical Problems

However, a value detected by the air flow sensor may vary even under the unchanged operational conditions if there is great environmental change in the current drive cycle in comparison with the last drive cycle such as substantial change in ambient temperature due to large shift in weather or/and substantial change in atmospheric pressure due to change in altitude by move of the vehicle; thus, there is a fear that the gas return pipe may be erroneously determined to be in disconnection despite of being connected or that the gas return pipe may be erroneously determined to be normal despite of being in disconnection.

The invention was made in view of the above and has its object to make it possible to accurately determine disconnection of a gas return pipe in a closed breather.

Solution to Problems

The invention is directed to a method for detecting disconnection of a closed breather which separates and recovers oil mist from blow-by gas extracted from an engine to return the blow-by gas through a gas return pipe to an intake pipe, characterized by calculating a mass flow rate of in-cylinder working gas on the basis of a boost pressure, an intake temperature in an intake manifold and a rotational frequency of the engine under a condition of no exhaust gas recirculation being conducted, determining whether the calculated mass flow rate is divergent from a value detected by an air flow sensor or not, comparing a divergence in a last determination and a current divergence when determined to be divergent, and determining disconnection of the gas return pipe from the intake pipe when a difference between both the divergences is beyond a predetermined range.

Under the condition of no exhaust gas recirculation being conducted, the calculated mass flow rate of the in-cylinder working gas is to be the same as the value detected by the air flow sensor. If there is a divergence therebetween, a cause thereof conceivable is characteristic abnormality of the air flow sensor itself due to deterioration thereof or disconnection of the gas return pipe. The disconnection of the gas return pipe abruptly occurs by forgotten re-connection of the gas return pipe after completion of maintenance work or the like or disconnection for some reason or other of the return pipe having been incompletely connected to the intake pipe. Thus, if a difference between the divergence in the last determination and the current divergence is great beyond the predetermined range, the gas return pipe can be determined to be in disconnection from the intake pipe.

By contrast, despite of the calculated mass flow rate of the in-cylinder working gas being divergent from the value detected by the air flow sensor, if the difference between the divergence in the last determination and the current divergence is small within the predetermined range, it can be determined that the divergence between the calculated mass flow rate of the in-cylinder working gas and the value detected by the air flow sensor is caused by characteristic abnormality of the air flow sensor itself due to deterioration thereof.

Because, existing air flow sensors are of hot-wire type where electric current is applied to a wire exposed to an intake air flow so as to keep a temperature of the wire constant, an air flow rate being detected by reading a value of electric current (the more the air flow rate is, the more the wire is cooled and the more the electric current is required so as to keep the temperature of the wire constant). In such air flow sensor, deterioration thereof slowly progresses with dusts gradually accumulated on the wire (sensing portion), which is deemed to cause not-so-great difference between the divergence in the last determination and the current divergence.

In the invention, it is preferable that whether values detected by the boost pressure sensor and by the atmospheric pressure sensor are divergent or not in the key-off is determined and stored and that a fact of the non-divergence determination being stored is used as a precondition.

More specifically, in the key-off, the values detected by the boost pressure sensor and by the atmospheric pressure sensor are to be the same. If the fact of the non-divergence determination being stored is used as the precondition, it can be preliminarily confirmed that the boost pressure sensor and the atmospheric pressure sensor are normal.

In this connection, if determined and stored is a fact that values detected by the boost pressure sensor and by the atmospheric pressure sensor are divergent in the key-off, then it is deemed that either of the boost pressure sensor or the atmospheric pressure sensor has characteristic abnormality.

More specifically, if the calculated mass flow rate of the in-cylinder working gas is determined to be divergent from the value detected by the air flow sensor, the boost pressure used in calculation of the mass flow rate of the in-cylinder working gas is deemed to be erroneous and thus, it can be determined that the boost pressure sensor for detecting the boost pressure has characteristic abnormality.

By contrast, if the calculated mass flow rate of the in-cylinder working gas is determined not to be divergent from the value detected by the air flow sensor, then the boost pressure used in calculation of the mass flow rate of the in-cylinder working gas is deemed to be accurately detected; thus, normality of the boost pressure sensor is settled so that it can be determined that the remainder, i.e., the atmospheric pressure sensor has characteristic abnormality.

Advantageous Effects of Invention

According to a method for detecting disconnection of a closed breather of the invention as mentioned in the above, various excellent effects and advantages can be obtained as follows.

(I) By comparing a calculated mass flow rate of in-cylinder working gas with a value detected by an air flow sensor obtained under environmental conditions unchanged, and further by comparing the divergence in the last determination and the current divergence for exclusion of any possible characteristic abnormality due to deterioration of the air flow sensor itself, disconnection of the gas return pipe of the closed breather can be accurately determined with no affection by environmental change for example in ambient temperature and/or in atmospheric pressure.

(II) A determination way may be employed that when the calculated mass flow rate of the in-cylinder working gas is determined to be divergent from the value detected by the air flow sensor, comparison is made between the divergence in the last determination and the current divergence; difference in both the divergences is within a predetermined range, the air flow sensor is determined to be deteriorated itself and have characteristic abnormality. Then, in addition to the accurate determination on disconnection of the gas return pipe of the closed breather, characteristic abnormality of the air flow sensor itself due to deterioration thereof may be determined.

(III) A determination way may be employed that whether values detected by a boost pressure sensor and by an atmospheric pressure sensor are divergent or not in a key-off is determined and stored and that a fact of the non-divergence determination being stored is used as a precondition; then, normality of the boost pressure sensor and of the atmospheric pressure sensor can be preliminarily confirmed, which can further enhance the reliability in the determination on disconnection of the gas return pipe of the closed breather.

(IV) A determination way may be employed that when a determination that the values detected by the boost pressure sensor and by the atmospheric pressure sensor are divergent in the key-off is stored and if the calculated value of the mass flow rate of the in-cylinder working gas is determined to be divergent from the value detected by the air flow sensor, the boost pressure sensor for detecting the boost pressure is determined to have characteristic abnormality. Then, in addition to the accurate determination on disconnection of the gas return pipe in the closed breather, the boost pressure sensor for detecting the boost pressure may be determined to have characteristic abnormality.

(V) A determination way may be employed that when a determination that the values detected by the boost pressure sensor and by the atmospheric pressure sensor are divergent in the key-off is stored and if the calculated value of the mass flow rate of the in-cylinder working gas is determined not to be divergent from the value detected by the air flow sensor, then the atmospheric pressure sensor for detecting atmospheric pressure is determined to have characteristic abnormality. Then, in addition to the accurate determination on disconnection of the gas return pipe in the closed breather, the atmospheric pressure sensor for detecting atmospheric pressure may be determined to have characteristic abnormality.

BRIEF DESCRIPTION OF DRAWING

FIG. 1 is a schematic view showing an embodiment of the invention.

DESCRIPTION OF EMBODIMENT

Next, an embodiment of the invention will be described in conjunction with the drawing.

FIG. 1 shows the embodiment of the invention in which reference numeral 1 denotes an engine with a turbocharger 2. The turbocharger 2 has a compressor 2a to which intake air 4 guided from an air cleaner 3 is passed through an intake pipe 5. The intake air 4 pressurized by the compressor 2a is passed to an intercooler 6 for cooling and then is guided to an intake manifold 7 where the air is distributed to respective cylinders 8 of the engine 1.

The exhaust gas 9 discharged through the cylinders 8 of the engine 1 is fed through an exhaust manifold 10 to a turbine 2b of the turbocharger 2. The exhaust gas 9 having driven the turbine 2b is discharged through an exhaust pipe 11 to outside of the vehicle.

An end of the exhaust manifold 10 in a direction of arrangement of the cylinders 8 is connected to a portion of the intake pipe 5 downstream of the intercooler 6 through an EGR pipe 12 so as to extract part of the exhaust gas 9 from the exhaust manifold 10 and guide the same as EGR gas 9' into the intake pipe 5.

The EGR pipe 12 is provided with an EGR valve 13 for selective opening/closing of the EGR pipe 12 and with an EGR cooler 14 for cooling of the EGR gas 9' flowing through the EGR pipe 12. The EGR cooler 14 is adapted to lower the EGR gas 9' in temperature through heat exchange with cooling water guided from the engine 1.

Extracted from the cylinder head cover 15 of the engine 1 through a gas vent pipe 16 is blow-by gas 17 which is passed through a closed breather 18 for separation and recovery of oil mist and is returned through a gas return pipe 19 to the intake pipe 5 while the oil recovered in the closed breather 18 is returned through an oil recovery pipe 20 to an oil pan (not shown).

Further, a temperature of the intake air 4 passed through the intercooler 6 is detected by an intercooler outlet temperature sensor 21. A temperature of the intake air 4 mixed with the EGR gas 9' and to be guided to the intake manifold 7 is detected by an intake manifold temperature sensor 22. A temperature and a mass flow rate of the intake air 4 (fresh air) guided from the air cleaner 3 are detected by an intake temperature sensor 23 and an air flow sensor 24, respectively.

Here, for convenience of explanation, the intake temperature sensor 23 and the air flow sensor 24 are separately disclosed. However, actually the temperature of the intake air 4 (fresh air) is required for obtaining the mass flow rate of the intake air 4, so that the intake temperature sensor 23 is usually built in the air flow sensor 24.

A boost pressure of the intake air 4 to be guided to the intake manifold 7 is detected by a boost pressure sensor 25 arranged in the intake pipe 5 at a position adjacent to the intake manifold 7, and an atmospheric pressure is detected by an atmospheric pressure sensor 27 in a controller 26 constituting an engine controlling computer (ECU: Electronic Control Unit).

Values detected by the intercooler outlet temperature sensor 21, the intake manifold temperature sensor 22, the intake temperature sensor 23, the air flow sensor 24, the boost pressure sensor 25 and the atmospheric pressure sensor 27 are inputted to the controller 26. Also inputted to the controller 26 are values detected by an accelerator sensor (not shown) for detection of an accelerator opening degree as load of the engine 1 and by an rotation sensor 28 for detection of a rotational frequency of the engine 1.

In the controller 26, under a condition of no exhaust gas 9 recirculation being conducted, a mass flow rate of in-cylinder working gas is calculated on the basis of the boost pressure, the intake temperature of intake manifold 7 and the rotational frequency of the engine, and whether the calculated mass flow rate is divergent from the value detected by the air flow sensor 24 or not is determined. If the values are divergent, "abnormality" determination is made; if not, "normality" determination is made.

A volumetric summation of the cylinders 8 of the engine 1 is fixed and a volumetric flow rate of the working gas taken in by the engine 1 per rotation thereof is already ascertained so that, if the boost pressure, the intake temperature of the intake manifold 7 and the rotational frequency of the engine are revealed, then the mass flow rate of the working gas per unit time (consistent with unit time in detection by the air flow sensor 24) can be calculated, using gas state equation.

In comparison of such calculated mass flow rate of the in-cylinder working gas with the value detected by the air flow sensor 24, a preposition is that no exhaust gas 9 recirculation is conducted. Thus, in the embodiment, the above-mentioned determination is made at cold startup of the engine 1 which has been stopped for more than a predetermined time and is stone-cold. Specifically, at the cold startup, a warm-up mode is applied; i.e., warm-up of the engine 1 is usually prioritized with the EGR valve 13 being closed, and the exhaust gas 9 is not recirculated. Thus, it is reasonable to conduct the above-mentioned determination at such cold startup.

Whenever the calculated mass flow rate of the in-cylinder working gas is determined to be divergent from the value detected by the air flow sensor 24, a divergence between the values is calculated and stored; and at the same time, a divergence in a last determination is compared with the current divergence. Then, if a difference between both the divergences is great beyond a predetermined range, "abnormality" determination is made; if difference between both the divergences is small within the predetermined range, "normality" determination is made.

Further, in the controller 26, whether the values detected by the boost pressure sensor 25 and by the atmospheric pressure sensor 27 are divergent or not in the key-off is determined and stored. If the values are divergent, "abnormality" determination is made; if not, "normality" determination is made.

Then, in the controller 26, on the basis of the "normality"/ "abnormality" determinations on the above-mentioned three items, the "normality"/"abnormality" determinations on the three items are compared in light of an abnormality establishment table as shown in Table 1 to thereby determine whether there is disconnection of the gas return pipe 19 or characteristic abnormality of the air flow sensor 24, the boost pressure sensor 25 or the atmospheric pressure sensor 27 in the closed breather system.

TABLE 1

| | EVENT | | |
|---|---|---|---|
| FAILURE | COMPARISON OF CALCULATED MASS FLOW RATE OF IN-CYLINDER WORKING GAS WITH VALUE DETECTED BY AIRFLOW SENSOR | COMPARISON OF DIVERGENCE IN LAST DETERMINATION WITH CURRENT DIVERGENCE | COMPARISON BETWEEN VALUES DETECTED BY BOOST PRESSURE SENSOR AND BY ATMOSPHERIC PRESSURE SENSOR |
| DISCONNECTION OF CLOSED BREATHER | X | X | ○ |
| CHARACTERISTIC ABNORMALITY (DETERIORATION) OF AIR FLOW SENSOR | X | ○ | ○ |
| CHARACTERISTIC ABNORMALITY OF BOOST PRESSURE SENSOR | X | — | X |
| CHARACTERISTIC ABNORMALITY OF ATMOSPHERIC | ○ | — | X |

TABLE 1-continued

| | EVENT | | |
|---|---|---|---|
| FAILURE | COMPARISON OF CALCULATED MASS FLOW RATE OF IN-CYLINDER WORKING GAS WITH VALUE DETECTED BY AIRFLOW SENSOR | COMPARISON OF DIVERGENCE IN LAST DETERMINATION WITH CURRENT DIVERGENCE | COMPARISON BETWEEN VALUES DETECTED BY BOOST PRESSURE SENSOR AND BY ATMOSPHERIC PRESSURE SENSOR |
| PRESSURE SENSOR | | | |

◯: NORMALITY
X: ABNORMALITY
—: NO RELATION

Specifically, under condition of cold startup or other where no exhaust gas 9 recirculation is conducted, the calculated mass flow rate of the in-cylinder working gas is to be the same as the value detected by the air flow sensor 24. If there is a divergence therebetween, a cause thereof conceivable is characteristic abnormality of the air flow sensor 24 itself due to deterioration thereof or disconnection of the gas return pipe 19. The disconnection of the gas return pipe 19 abruptly occurs by forgotten re-connection of the gas return pipe 19 after completion of maintenance work or the like or disconnection for some reason or other of the gas return pipe having been incompletely connection to the intake pipe 5. Thus, if a difference between the divergence in the last determination and the current divergence is great beyond the predetermined range, the gas return pipe 19 can be determined to be in disconnection from the intake pipe 5.

By contrast, despite of the calculated mass flow rate of the in-cylinder working gas being divergent from the value detected by the air flow sensor 24, if the difference between the divergence in the last determination and the current divergence is small within the predetermined range, it can be determined that the divergence between the calculated mass flow rate of the in-cylinder working gas and the value detected by the air flow sensor 24 is caused by the characteristic abnormality of the air flow sensor 24 itself due to deterioration thereof.

Because, existing air flow sensors 24 are of hot-wire type where electric current is applied to a wire exposed to an intake air 4 flow so as to keep a temperature of the wire constant, an air flow rate being detected by reading a value of electric current (the more the air flow rate is, the more the wire is cooled and the more the electric current is required so as to keep the temperature of the wire constant). In such air flow sensor, deterioration thereof slowly progresses with dusts gradually accumulated on the wire (sensing portion), which is deemed to cause not-so-great difference between the divergence in the last determination and the current divergence.

In this regard, in order to conduct such determination, it is necessary to confirm reliability of the boost pressure sensor 25 for detection of the boost pressure required for calculation of the mass flow rate of the in-cylinder working gas. Thus, whether values detected by the boost pressure sensor 25 and by the atmospheric pressure sensor 27 are divergent or not in a key-off is determined and stored, and a fact of the non-divergent determination being stored is used as a precondition.

Specifically, the value detected by the boost pressure sensor 25 is to be the same as the value detected by the atmospheric pressure sensor 27 in the key-off. If the non-divergent determination being stored is used as a preposition, the normality of the boost pressure sensor 25 can be preliminarily confirmed. In this case, the normality of the atmospheric pressure sensor 27 can be also confirmed.

In this connection, if determined and stored is a fact that the valued detected by the boost pressure sensor 25 and by the atmospheric pressure sensor 27 are divergent in the key-off, then it is deemed that either of the boost pressure sensor 25 or the atmospheric pressure sensor 27 has characteristic abnormality.

Specifically, if the calculated mass flow rate of the in-cylinder working gas is determined to be divergent from the value detected by the air flow sensor 24, the boost pressure used in calculation of the mass flow rate of the in-cylinder working gas is deemed to be erroneous and thus, it can be determined that the boost pressure sensor 25 for detecting the boost pressure has characteristic abnormality.

By contrast, if the calculated mass flow rate of the in-cylinder working gas is determined not to be divergent from the value detected by the air flow sensor 24, then the boost pressure used in calculation of the mass flow rate of the in-cylinder working gas is deemed to be accurately detected; thus, normality of the boost pressure sensor 25 is settled so that it can be determined that the reminder, i.e., the atmospheric pressure sensor 27 has characteristic abnormality.

More strictly speaking, also required is confirmation on reliability of the intake manifold temperature sensor 22 for detecting the intake temperature of the intake manifold 7 required for calculation of the mass flow rate of the in-cylinder working gas. However, intake-air temperature sensors, which have not-so-severe temperature range requirements, generally have higher reliability, so that the intake-air temperature sensors are not added in the abnormality establishment table for the controller 26 (see Table 1).

However, reliability of the intake manifold temperature sensor 22 may be confirmed as needs demand. For example, at the cold startup where the mass flow rate of the in-cylinder working gas is calculated, normal detection may be settled by confirming that the value detected by the intake temperature sensor 23 is the same as those of the intercooler outlet temperature sensor 21 and the intake manifold temperature sensor 22.

Specifically, at the cold startup of the engine 1 where the engine 1 is stone-cold and warm-up control is prioritized with the EGR valve 13 being closed, each of the temperatures detected by the intercooler outlet temperature sensor 21 and by the intake manifold temperature sensor 22 is to be the same as ambient air temperature, and the intake temperature sensor 23 for detecting the ambient air temperature is to have the same detected value.

In addition, the rotational frequency of the engine used for calculation of the mass flow rate of the in-cylinder working gas is detected by the rotation sensor 28; and generally the engine rotational frequency is also detected by a crank angle sensor (not shown) in addition to the illustrated rotation sensor 28 (main rotation sensor). These sensors are not added in the abnormality establishment table (see Table 1) for the controller 26 since highly reliable rotational frequency is easily used for the calculation. However, of course, agreement of the rotational frequency detected by the crank angle sensor with the value detected by the rotation sensor 28 may be confirmed to settle the normal detection of the engine rotational frequency.

As is clear from the foregoing, according to the above embodiment, comparison is made between the calculated mass flow rate of the in-cylinder working gas and the value detected by the air flow sensor 24 which are obtained in the environmental condition unchanged, and further comparison is made between the deviation in the last determination and the current deviation for exclusion of any possible characteristic abnormality due to deterioration of the air flow sensor 24 itself, so that disconnection of the gas return pipe 19 in the closed breather system can be accurately determined with no affection by environmental change for example in ambient temperature and/or in atmospheric pressure. Moreover, in addition to the accurate determination on the disconnection of the gas return pipe 19, characteristic abnormality due to deterioration of the air flow sensor 24 itself may be determined. Further, for conducting such determination, the normality of the boost pressure sensor 25 and of the atmospheric pressure sensor 27 may be preliminarily confirmed to further enhance the reliability in determination of the disconnection of the gas return pipe 19 in the closed breather system.

Further, especially in the embodiment, in addition to the accurate determination on disconnection of the gas return pipe 19 in the closed breather system, characteristic abnormality of the boost pressure sensor 25 for detecting the boost pressure or of the atmospheric pressure sensor 27 for detecting the atmospheric pressure may be determined.

It is to be understood that a method for detecting disconnection of a closed breather according to the invention is not limited to the above embodiment and that various changes and modifications may be made without departing from the scope of the invention.

REFERENCE SIGNS LIST 1 engine
4 intake air
5 intake pipe
7 intake manifold
8 cylinder
17 blow-by gas
18 closed breather
19 gas return pipe
23 intake temperature sensor
24 air flow sensor
25 boost pressure sensor
27 atmospheric pressure sensor

The invention claimed is:

1. A method for detecting disconnection of a closed breather which separates and recovers oil mist from blow-by gas extracted from an engine to return the blow-by gas through a gas return pipe to an intake pipe, comprising:
  calculating a mass flow rate of in-cylinder working gas on the basis of a boost pressure, an intake temperature in an intake manifold, and a rotational frequency of the engine under a condition of no exhaust gas recirculation being conducted,
  determining whether the calculated mass flow rate is divergent from a value detected by an air flow sensor or not,
  comparing a divergence in a last determination and a current divergence when determined to be divergent, and
  determining disconnection of the gas return pipe from the intake pipe when a difference between both the divergences is beyond a predetermined range,
  wherein whether values detected by a boost pressure sensor and by an atmospheric pressure sensor are divergent or not in a key-off state is determined and stored and a fact of non-divergence determination being stored is used as a precondition.

2. The method for detecting disconnection of the closed breather as claimed in claim 1, wherein if the calculated mass flow rate of the in-cylinder working gas is determined to be divergent from the value detected by the air flow sensor, the divergence in the last determination is compared with the current divergence; and if the difference between both the divergences is within the predetermined range, the air flow sensor is determined to have characteristic abnormality due to deterioration of the air flow sensor itself.

3. The method for detecting disconnection of the closed breather as claimed in claim 2, wherein when the values detected by the boost pressure sensor and by the atmospheric pressure sensor in the key-off state is determined and stored to be divergent and if the calculated mass flow rate of the in-cylinder working gas is determined to be divergent from the value detected by the air flow sensor, the boost pressure sensor for detecting the boost pressure is determined to have characteristic abnormality.

4. The method for detecting disconnection of the closed breather as claimed in claim 2, wherein when the values detected by the boost pressure sensor and by the atmospheric pressure sensor in the key-off state is determined and stored to be divergent and if the calculated mass flow rate of the in-cylinder working gas is determined not to be divergent from the value detected by the air flow sensor, the atmospheric pressure sensor for detecting the atmospheric pressure is determined to have characteristic abnormality.

5. The method for detecting disconnection of the closed breather as claimed in claim 1, wherein when the values detected by the boost pressure sensor and by the atmospheric pressure sensor in the key-off state is determined and stored to be divergent and if the calculated mass flow rate of the in-cylinder working gas is determined to be divergent from the value detected by the air flow sensor, the boost pressure sensor for detecting the boost pressure is determined to have characteristic abnormality.

6. The method for detecting disconnection of the closed breather as claimed in claim 1, wherein when the values detected by the boost pressure sensor and by the atmospheric pressure sensor in the key-off state is determined and stored to be divergent and if the calculated mass flow rate of the in-cylinder working gas is determined not to be divergent from the value detected by the air flow sensor, the atmospheric pressure sensor for detecting the atmospheric pressure is determined to have characteristic abnormality.

* * * * *